United States Patent
Lin et al.

(10) Patent No.: US 10,348,163 B2
(45) Date of Patent: Jul. 9, 2019

(54) STATOR ASSEMBLY AND ENGAGING TYPE STATOR CORE

(71) Applicant: Chicony Power Technology Co., Ltd., New Taipei (TW)

(72) Inventors: Yu-Chin Lin, New Taipei (TW);
Shih-Wei Hung, New Taipei (TW);
Shao-Chung Yuan, New Taipei (TW);
Yin-Jao Luo, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 164 days.

(21) Appl. No.: 15/441,213

(22) Filed: Feb. 23, 2017

(65) Prior Publication Data

US 2018/0175706 A1 Jun. 21, 2018

(51) Int. Cl.
| | |
|---|---|
| *H02K 1/14* | (2006.01) |
| *H02K 1/18* | (2006.01) |
| *H02K 9/22* | (2006.01) |
| *H02K 3/52* | (2006.01) |

(52) U.S. Cl.
CPC .............. *H02K 9/22* (2013.01); *H02K 1/146* (2013.01); *H02K 1/148* (2013.01); *H02K 1/185* (2013.01); *H02K 3/522* (2013.01); *H02K 2213/03* (2013.01)

(58) Field of Classification Search
CPC ............ H02K 1/148; H02K 1/12; H02K 1/14; H02K 2213/03; H02K 2201/00; H02K 2201/15
See application file for complete search history.

(56) References Cited

U.S. PATENT DOCUMENTS

| | | | | |
|---|---|---|---|---|
| 6,472,780 | B2* | 10/2002 | Kikuchi | H02K 1/148 310/216.056 |
| 7,719,157 | B2* | 5/2010 | Yukitake | F04C 15/008 310/216.049 |
| 7,986,064 | B2* | 7/2011 | Katagiri | H02K 1/148 310/216.008 |
| 8,102,092 | B2 | 1/2012 | Tomohara et al. | |
| 8,413,318 | B2* | 4/2013 | Ikeda | H02K 1/148 29/417 |
| 8,689,427 | B2* | 4/2014 | Bourqui | H02K 1/148 29/596 |
| 8,884,490 | B2 | 11/2014 | Meier et al. | |
| 9,531,222 | B2* | 12/2016 | Uchitani | H02K 1/148 |

(Continued)

FOREIGN PATENT DOCUMENTS

| | | |
|---|---|---|
| CN | 102122868 A | 7/2011 |
| CN | 1691466 B | 11/2011 |

(Continued)

*Primary Examiner* — Burton S Mullins
(74) *Attorney, Agent, or Firm* — CKC & Partners Co., LLC (57) ABSTRACT

A stator assembly is used to be assembled to form a stator core. The stator assembly includes a tooth and a yoke. One end of the tooth is connected to the yoke. The yoke has an inner side, an outer side, a first coupling side, and a second coupling side. The first coupling side further includes a first engaging structure, and the second coupling side further includes a second engaging structure. The second engaging structure corresponds the first engaging structure. The outer side has a groove. The groove has a side surface and a bottom surface. An angle is defined between the side surface and the bottom surface, and the angle is in a range from 135° to 165°.

8 Claims, 6 Drawing Sheets

(56) References Cited

U.S. PATENT DOCUMENTS

| | | | | |
|---|---|---|---|---|
| 2013/0026878 A1* | 1/2013 | Feuerrohr | ............. | H02K 1/148 310/216.136 |
| 2014/0015349 A1 | 1/2014 | Chamberlin et al. | | |
| 2015/0333577 A1* | 11/2015 | Jang | ...................... | H02K 1/185 310/216.009 |
| 2016/0301266 A1* | 10/2016 | Seo | ......................... | H02K 1/14 |

FOREIGN PATENT DOCUMENTS

| | | | | |
|---|---|---|---|---|
| CN | 101958612 B | 8/2012 | | |
| CN | 102723792 A | 10/2012 | | |
| CN | 103370854 A | 10/2013 | | |
| CN | 203339819 U | 12/2013 | | |
| CN | 205160327 U | 4/2016 | | |
| DE | 102013201320 B4 * | 10/2016 | ............. | H02K 15/02 |

\* cited by examiner

STATOR ASSEMBLY AND ENGAGING TYPE STATOR CORE

RELATED APPLICATIONS

This application claims priority to Taiwan Application Serial Number 105142096, filed Dec. 19, 2016, which are herein incorporated by reference.

BACKGROUND

Technical Field

The present disclosure relates to a stator assembly and an engaging type stator core.

Description of Related Art

A motor is a machine designed to convert electrical energy into mechanical energy and then generate kinetic energy by utilizing the mechanical energy, so that the motor can drive other devices. Most electric motors generate kinetic energy in the motor through the magnetic field and the current in the coils. The principle of the motor and the generator is basically the same, the difference is that of the direction of energy conversion. A Generator does this through the load (such as water, wind) to convert mechanical energy and kinetic energy into electrical energy; if there is no load, the generator will not generate current.

To further improve the motors, persons in the industry have made every endeavor to discover new solutions. The application and improvement of the motors have become one of the most important research topics.

SUMMARY

This disclosure provides a stator assembly to prevent the deformation issue due to the heat stress generated during the assembling process.

In one aspect of the disclosure, a stator assembly is used to be assembled to form a stator core. The stator assembly includes a tooth and a yoke. One end of the tooth is connected to the yoke. The yoke has an inner side, an outer side, a first coupling side, and a second coupling side. The first coupling side further includes a first engaging structure, and the second coupling side further includes a second engaging structure. The second engaging structure corresponds the first engaging structure. The outer side has a groove. The groove has a side surface and a bottom surface. An angle is defined between the side surface and the bottom surface, and the angle is in a range from 135° to 165°.

In one or more embodiments, a distance between the first engaging structure and the outer side is less than a distance between the first engaging structure and the inner side.

In one or more embodiments, the inner side includes an outer segment and an inner segment, the outer segment is an arc segment, and the inner segment is a linear segment.

In one or more embodiments, a width of a portion of the yoke corresponding the inner segment decreases as a distance between the portion and the tooth increases, and widths of portions of the yoke corresponding the outer segment are approximately the same.

In one or more embodiments, a length ratio of the outer segment to the inner segment is 1:1.

In one or more embodiments, a portion connecting the inner segment and the tooth has a circular arc angle, and a ratio of the inner segment to a length of a radius of the circular arc angle is 4:1.

In one or more embodiments, a ratio of a distance between the first engaging structure and the inner side to the outer segment is 1:1-2.

In one or more embodiments, an engaging type stator core includes a plurality of the stator assemblies, in which the stator assemblies are annularly arranged and engaged with each other to form a closed annular structure, and an outer surface of the closed annular structure is formed by the outer sides of the stator assemblies.

In one or more embodiments, the engaging type stator core further includes a heat-dissipating structure sleeved on the outer surface of the closed annular structure.

In one or more embodiments, an inner surface of the heat-dissipating structure has a plurality of protruding portions, the protruding portions correspond to the grooves of the outer surface of the closed annular structure, the protruding portions and the grooves are coupled and fixed to each other when the heat-dissipating structure is assembled to the closed annular structure.

When the heat-dissipating structure applies shrink stress to the stator assembly, the outer side is in contact with the heat-dissipating structure, and the groove of the outer side is not in contact with the heat-dissipating structure. Therefore, a large amount of stress will be concentrated in the groove of the heat-dissipating structure, such that a deformation may happen and two ends of the yoke extrudes toward the groove. If the stator assembly is deformed, the distribution of the magnetic flux in the stator assembly will be affected, such that the amount of the magnetic flux will become smaller. To avoid the aforementioned issue, the angle θ defined between the side surface and the bottom surface of the groove is in a range from 135° to 165°, so the deformation issue of the yoke is alleviated.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
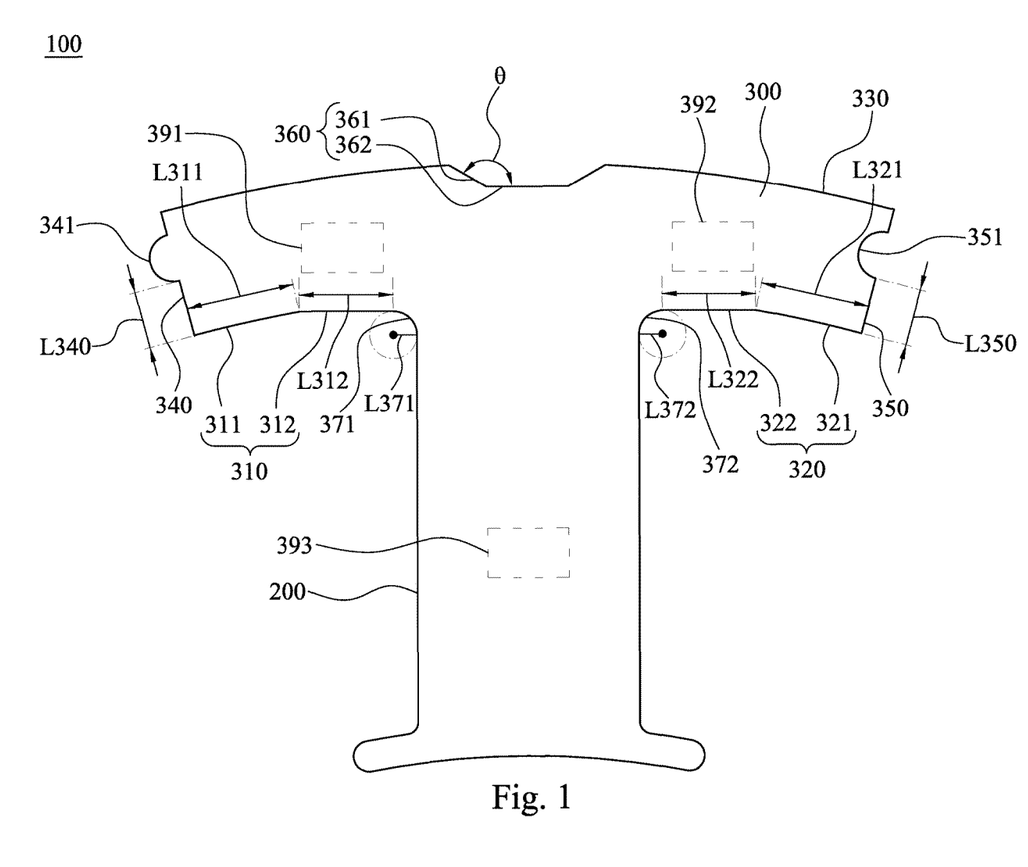
FIG. 1 is a schematic side view of a stator assembly according to one embodiment of this disclosure.

FIG. 1 is a schematic side view of a stator assembly 100 according to one embodiment of this disclosure. A stator assembly 100 is provided, and the stator assembly 100 is used to be assembled to form a stator core of a motor. As shown in FIG. 1, the stator assembly 100 includes a tooth 200 and a yoke 300. One end of the tooth 200 is connected to the yoke 300. The yoke 300 has inner sides 310 and 320, an outer side 330, a first coupling side 340, and a second coupling side 350. The inner side 310 is connected to the tooth 200 and the first coupling side 340. The first coupling side 340 is connected to the inner side 310 and the outer side 330. The outer side 330 is connected to the first coupling side 340 and the second coupling side 350. The second coupling side 350 is connected to the outer side 330 and the inner side 320. The inner side 320 is connected to the second coupling side 350 and the tooth 200. The first coupling side 340 further includes a first engaging structure 341, and the second coupling side 350 further includes a second engaging structure 351. The second engaging structure 351 corresponds the first engaging structure 341. The outer side 330 has a groove 360. The groove 360 has a side surface 361 and a bottom surface 362. An angle θ is defined between the side surface 361 and the bottom surface 362, and the angle θ is in a range from 135° to 165°.

Figure 2:
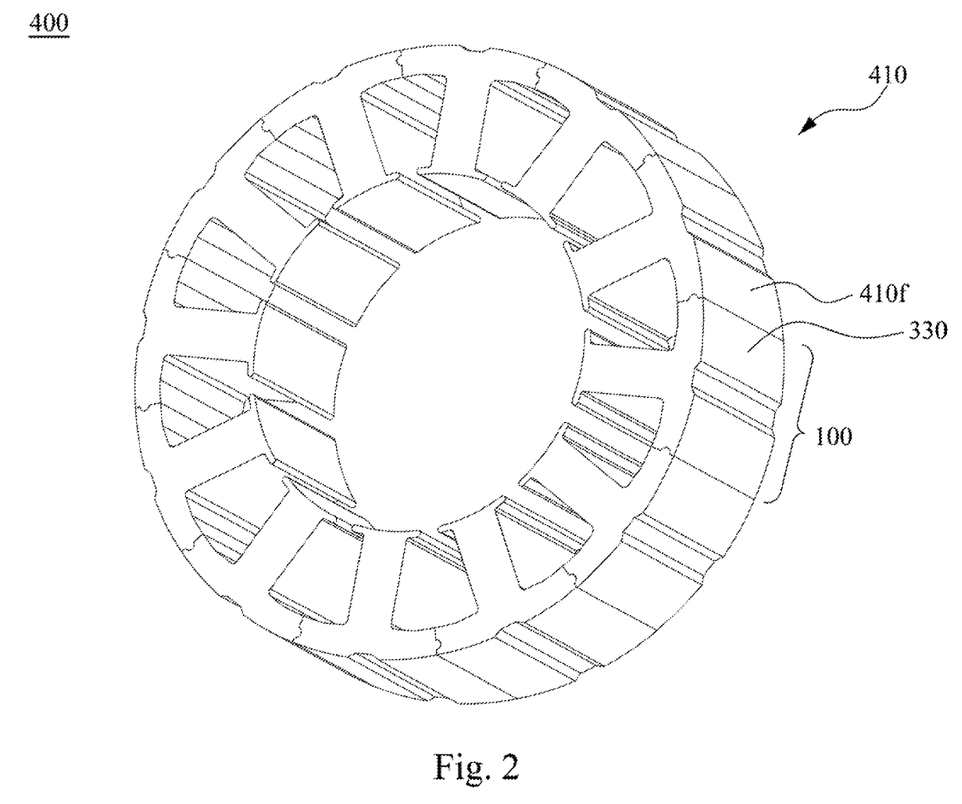
FIG. 2 is a schematic perspective view of an engaging type stator core according to one embodiment of this disclosure.

FIG. 2 is a schematic perspective view of an engaging type stator core 400 according to one embodiment of this disclosure. As shown in FIG. 1 and FIG. 2, an engaging type stator core 400 is provided. The engaging type stator core 400 includes a plurality of the stator assemblies 100, in which the stator assemblies 100 are annularly arranged and engaged with each other to form a closed annular structure 410, and an outer surface 410f of the closed annular structure 410 is formed by the outer sides 330 of the stator assemblies 100. In this embodiment, the engaging type stator core 400 includes twelve stator assemblies 100. The first engaging structure 341 of each of the stator assemblies 100 is engaged with the second engaging structure 351 of one adjacent stator assembly 100, and the second engaging structure 351 of each of the stator assemblies 100 is engaged with the first engaging structure 341 of another adjacent stator assembly 100.

Figure 3:
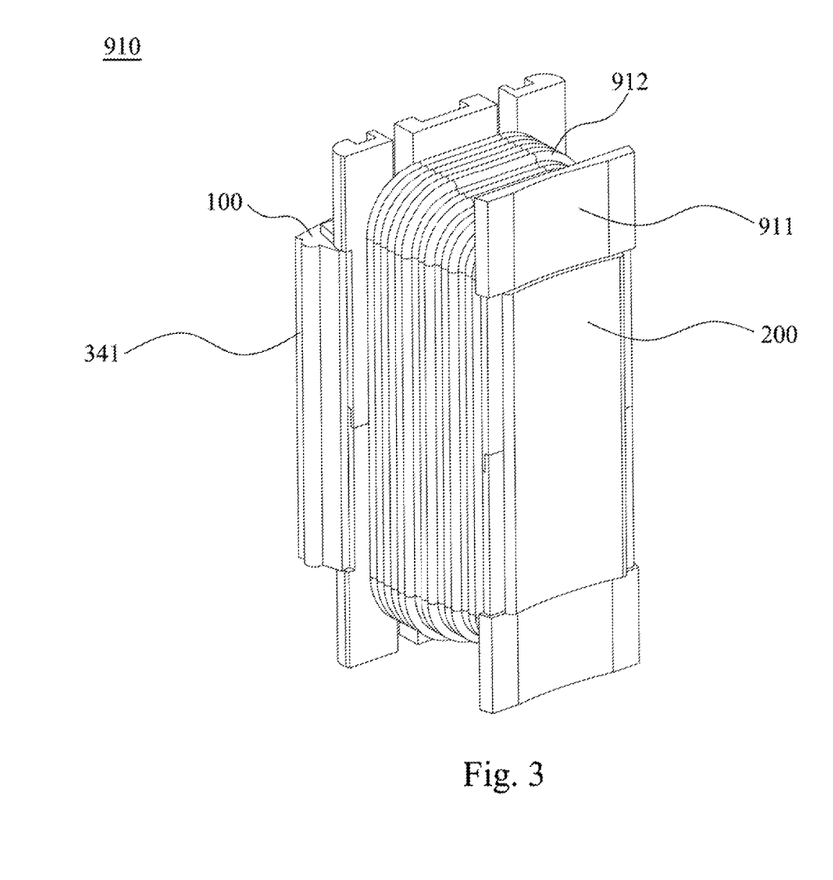
FIG. 3 is a schematic perspective view of a stator coil assembly according to one embodiment of this disclosure.

FIG. 3 is a schematic perspective view of a stator coil assembly 910 according to one embodiment of this disclosure. As shown in FIG. 3, an insulating frame 911 is assembled to the stator assembly 100, and coils 912 are wound around the outer side of the insulating frame 911, such that the stator coil assembly 910 is formed.

The insulating frame 911 may be made of insulating resin. Embodiments of this disclosure are not limited thereto.

The coils 912 may be copper coils 912. Embodiments of this disclosure are not limited thereto.

Figure 4:
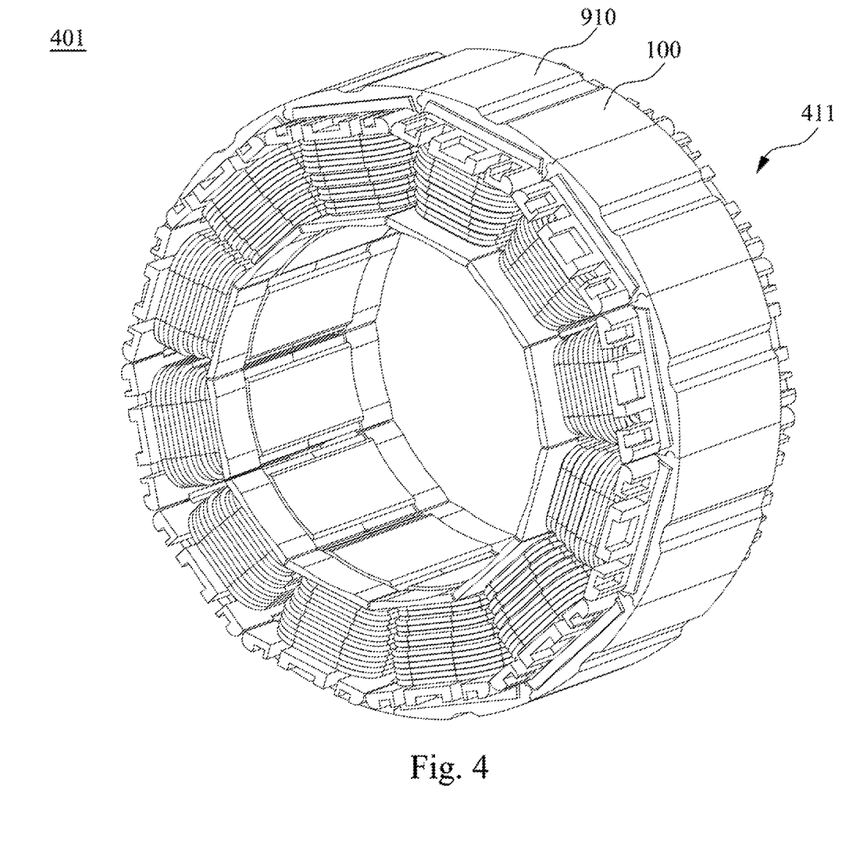
FIG. 4 is a schematic perspective view of the engaging type stator core according to another embodiment of this disclosure.

FIG. 4 is a schematic perspective view of the engaging type stator core 401 according to another embodiment of this disclosure. As shown in FIG. 4, the engaging type stator core 401 includes a plurality of the stator coil assemblies 910, in which the stator coil assemblies 910 are annularly arranged and engaged with each other to form a closed annular structure 411. As shown in FIG. 1, FIG. 2, and FIG. 4, this embodiment is similar to the embodiment of FIG. 2, the engaging type stator core 401 includes twelve stator coil assemblies 910. The first engaging structure 341 of the stator assembly 100 of each of the stator coil assemblies 910 is engaged with the second engaging structure 351 of the stator assembly 100 of one adjacent stator coil assembly 910, and the second engaging structure 351 of the stator assembly 100 of each of the stator coil assemblies 910 is engaged with the first engaging structure 341 of the stator assembly 100 of another adjacent stator coil assembly 910.

Figure 5:
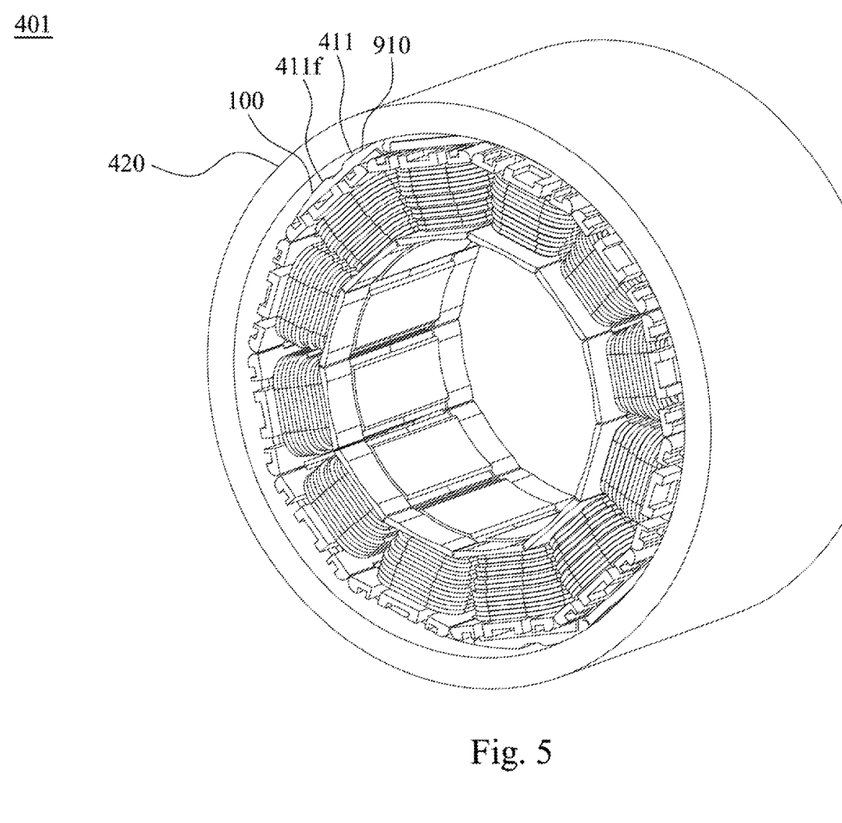
FIG. 5 is another schematic perspective view of the engaging type stator core according to another embodiment of this disclosure.

FIG. 5 is another schematic perspective view of the engaging type stator core 401 according to another embodiment of this disclosure. As shown in FIG. 5, the engaging type stator core 401 further includes a heat-dissipating structure 420 sleeved on the outer surface 411f of the closed annular structure 411.

The heat-dissipating structure 420 may be a heat-dissipating aluminum frame. Embodiments of this disclosure are not limited thereto.

The heat-dissipating structure 420 is assembled to the outer surface 411f of the closed annular structure 411 by interference heat fitting. Specifically, the inner diameter of the heat-dissipating structure 420 is smaller than the outer diameter of the closed annular structure 411 at room temperature. After the heat-dissipating structure 420 is heated, the inner diameter of the heat-dissipation structure 420 is greater than the outer diameter of the closed annular structure 411 because of thermal expansion. Therefore, the heat-dissipating structure 420 can be sleeved on the outer surface 411f of the closed annular structure 411.

Therefore, when the motor is operated, the temperature of the motor will rise from room temperature, and the closed annular structure 411 and the heat-dissipating structure 420 will still be in proper contact after the motor reaches the equilibrium temperature of the operation, such that the closed annular structure 411 and the heat-dissipating structure 420 have sufficient contact area to allow the heat generated by the closed annular structure 411 to be transferred to the heat-dissipating structure 420 while allowing the closed annular structure 411 to be fixed to the heat-dissipating structure 420 without falling off.

However, since the thermal expansion coefficients of the closed annular structure 411 and the heat-dissipating structure 420 are not the same, in the aforementioned design consideration, the heat-dissipating structure 420 will shrink at room temperature and apply shrink stress to the closed annular structure 411. Therefore, the structure of the stator assembly 100 may be damaged.

As shown in FIG. 1 and FIG. 5, when the heat-dissipating structure 420 applies shrink stress to the stator assembly 100, the outer side 330 is in contact with the heat-dissipating structure 420, and the groove 360 of the outer side 330 is not in contact with the heat-dissipating structure 420. Therefore, a large amount of stress will be concentrated in the groove 360 of the stator assembly 100, such that a deformation may happen and two ends of the yoke 300 extrudes toward the groove 360. If the stator assembly 100 is deformed, the distribution of the magnetic flux in the stator assembly 100 will be affected, such that the amount of the magnetic flux will become smaller. To avoid the aforementioned issue, the angle θ defined between the side surface 361 and the bottom surface 362 of the groove 360 is in a range from 135° to 165°, so the deformation issue of the yoke 300 is alleviated.

Embodiments of this disclosure are not limited thereto. In other embodiments, the angle θ may be in a range from 140° to 165°, a range from 145° to 165°, a range from 150° to 165°, a range from 135° to 160°, a range from 135° to 155°, a range from 135° to 150°, a range from 140° to 160°, a range from 140° to 155°, a range from 140° to 150°, a range from 145° to 160°, a range from 145° to 155°, or a range from 145° to 150°.

In addition, by disposing the groove 360 on the outer side 330, the positioning may become easier and the stator assembly 100 may be easier to be clamped during the assembling of the stator assembly 100, thereby increasing the yield of the assembly process. Furthermore, because the glue can flow along the groove 360, the groove 360 also facilitates the filling of the glue after the assembly process.

It is noted that the angle θ should not be too large, or the groove 360 will become too large, such that the groove 360 lose the functions of facilitating assembling and positioning and the yield of the assembly process cannot be increased.

The inner side 310 includes an outer segment 311 and an inner segment 312. The outer segment 311 is an arc segment, and the inner segment 312 is a linear segment. The inner side 320 includes an outer segment 321 and an inner segment 322. The outer segment 321 is an arc segment, and the inner segment 322 is a linear segment. In other words, a width of a portion of the yoke 300 corresponding the inner segment 312 or 322 decreases as a distance between the portion and the tooth 200 increases, and widths of portions of the yoke 300 corresponding the outer segment 311 or 321 are approximately the same.

As described above, the heat-dissipating structure 420 is in contact with the outer side 330 and thus applies shrink stress to the stator assembly 100. Because the cross-section of the outer side 330 is a circular arc, the shrink stress will be concentrated at the inner corners of both ends of the yoke 300 (i.e., the connecting portion of the outer segment 311 and the first coupling side 340 and the connecting portion of the outer segment 321 and the second coupling side 350), such that the stator assembly 100 may be deformed and the distribution of the magnetic flux in the stator assembly 100 may be affected. To avoid the aforementioned issue, the inner sides 310 and 320 are designed to include two segments, i.e., the outer segments 311 and 321 and the inner segments 312 and 322, so stress will not overly be concentrated at the inner corners of both ends of the yoke 300.

At the same time, stress may also be concentrated at the corner connecting the yoke 300 and the tooth 200 (i.e., the connecting portion of the inner segment 312 and the tooth 200 and the connecting portion of the inner segment 322 and the tooth 200). Therefore, by making the width of the portion of the yoke 300 corresponding the inner segment 312 or 322 decrease as a distance between the portion and the tooth 200 increases, the stress will not overly be concentrated at the corner connecting the yoke 300 and the tooth 200, so as to prevent the stator assembly 100 from being deformed.

The L311 and L321 are the lengths of the outer segments 311 and 321. The L312 and L322 are the lengths of the inner segments 312 and 322. The length ratio of the length L311 of the outer segment 311 to the length L312 of the inner segment 312 is 1:1, and the length ratio of the length L321 of the outer segment 321 to the length L322 of the inner segment 322 is 1:1. By the aforementioned ratio design, the stress is properly distributed, and the stress will not simultaneously overly be concentrated at the inner corners of both ends of the yoke 300 and the corners 371 and 372 connecting the yoke 300 and the tooth 200. Specifically, if the length ratio of the outer segment 311 to the inner segment 312 or the length ratio of the outer segment 321 to the inner segment 322 become larger, the widths of the portions of the yoke 300 corresponding the outer segment 311 and 321 will decrease, such that the contact areas of the first coupling side 340 and the second coupling side 350 of the stator assembly 100 and another adjacent stator assembly 100 will decrease and the stress may thus overly be concentrated on the first coupling side 340 and the second coupling side 350. Therefore, by the aforementioned ratio design, contact areas of the first coupling side 340 and the second coupling side 350 of the stator assembly 100 and other adjacent stator assemblies 100 will be large enough, such that the stress will not be overly concentrated on the first coupling side 340 and the second coupling side 350. In addition, if the contact areas of the first coupling side 340 and the second coupling side 350 of the stator assembly 100 and other adjacent stator assemblies 100 are larger, the magnetic flux passed from the first coupling side 340 and the second coupling side 350 increases as well. Embodiments of this disclosure are not limited thereto.

Further, the portion connecting the inner segment 312 and the tooth 200 has a circular arc angle 371, and the portion connecting the inner segment 322 and the tooth 200 has a circular arc angle 372. The circular arc angle 371 may be a quarter circular arc. The circular arc angle 372 may be a quarter circular arc.

As described above, the stress may be concentrated at the corners connecting the yoke 300 and the tooth 200. By disposing the circular arc angles 371 and 372 connecting the yoke 300 and the tooth 200, the stress concentrated at the corners connecting the yoke 300 and tooth 200 will be evenly distributed among the circular arc angles 371 and 372, such that the corners connecting the yoke 300 and the tooth 200 will not be deformed due to large stress.

The L371 shown in FIG. 1 means a length of the radius of the circular arc angle 371, and the L372 shown in FIG. 1 means a length of the radius of the circular arc angle 372. The ratio of the length L312 of the inner segment 312 to the length L371 of the radius of the circular arc angle 371 is 4:1, and the ratio of the length L322 of the inner segment 322 to the length L372 of the radius of the circular arc angle 372 is 4:1. By the aforementioned ratio design, the stress concentrated at the corners connecting the yoke 300 and tooth 200 will be evenly distributed among the circular arc angles 371 and 372, and the insulating frame 911 will not become too thin (the shape of the insulating frame 911 needs to match the shapes of the circular arc angles 371 and 372).

In this embodiment, the first engaging structure 341 is a convex structure, and the second engaging structure 351 is a recessed structure. Embodiments of this disclosure are not limited thereto. In other embodiments, the first engaging structure 341 may be a recessed structure, and the second engaging structure 351 may be a convex structure.

The distance between the first engaging structure 341 and the outer side 330 is less than the distance between the first engaging structure 341 and the inner side 310, and the distance between the second engaging structure 351 and the outer side 330 is less than the distance between the second engaging structure 351 and the inner side 320.

As described above, when the heat-dissipating structure 420 applies shrink stress to the stator assemblies 100, different stator assemblies 100 will apply stress to each other (different stator assemblies 100 are in contact with each other). Thus, stress is easily concentrated at the root portions of the inner sides of the first engaging structures 341 and the root portions of the inner sides of the second engaging structures 351. In order to alleviate the stress concentrated at the root portions of the inner sides of the first engaging structures 341 or the root portions of the inner sides of the second engaging structures 351, which may damage the structures of the stator assemblies 100 and thus destroy the distribution of the magnetic flux in the stator assemblies 100, the distance between the first engaging structure 341 and the outer side 330 is designed to be less than the distance between the first engaging structure 341 and the inner side 310, and the distance between the second engaging structure 351 and the outer side 330 is designed to be less than the distance between the second engaging structure 351 and the inner side 320. Therefore, the areas of the first coupling side 340 between the first engaging structure 341 and the inner side 310 and the second coupling side 350 between the second engaging structure 351 and the inner side 320 will increase, and the stress will be more evenly distributed among the portion of the first coupling side 340 adjacent to the inner side 310 and the portion of the second coupling side 350 adjacent to the inner side 320, such that the first engaging structure 341 and the adjacent portion and the second engaging structure 351 and the adjacent portion will not be damaged due to the overly concentrated stress. Therefore, the structure of the stator assembly 100 will not be damaged. In addition, because the distance between the first engaging structure 341 and the outer side 330 is less than the distance between the first engaging structure 341 and the inner side 310, and the distance between the second engaging structure 351 and the outer side 330 is less than the distance between the second engaging structure 351 and the inner side 320, the part of the first coupling side 340 between the first engaging structure 341 and the inner side 310 and the part of the second coupling side 350 between the second engaging structure 351 and the inner side 320 will respectively contact other adjacent stator assemblies 100 with larger contact areas, and the magnetic flux passing the first coupling side 340 and the second coupling side 350 will increase as well.

The ratio of the distance between the first engaging structure 341 and the outer side 330 to the distance between the first engaging structure 341 and the inner side 310 is 1:2-4, and the ratio of the distance between the second engaging structure 351 and the outer side 330 to the distance between the second engaging structure 351 and the inner side 320 is 1:2-4. Embodiments of this disclosure are not limited thereto.

In some embodiments, the distance between the first engaging structure 341 and the inner side 310 is L340, and the distance between the second engaging structure 351 and the inner side 320 is L350. In some embodiments, the ratio of the distance L340 between the first engaging structure 341 and the inner side 310 to the length L311 of the outer segment 311 is 1:1-2, and the ratio of the distance L350 between the second engaging structure 351 and the inner side 320 to the length L321 of the outer segment 321 is 1:1-2. Embodiments of this disclosure are not limited thereto.

Figure 6:
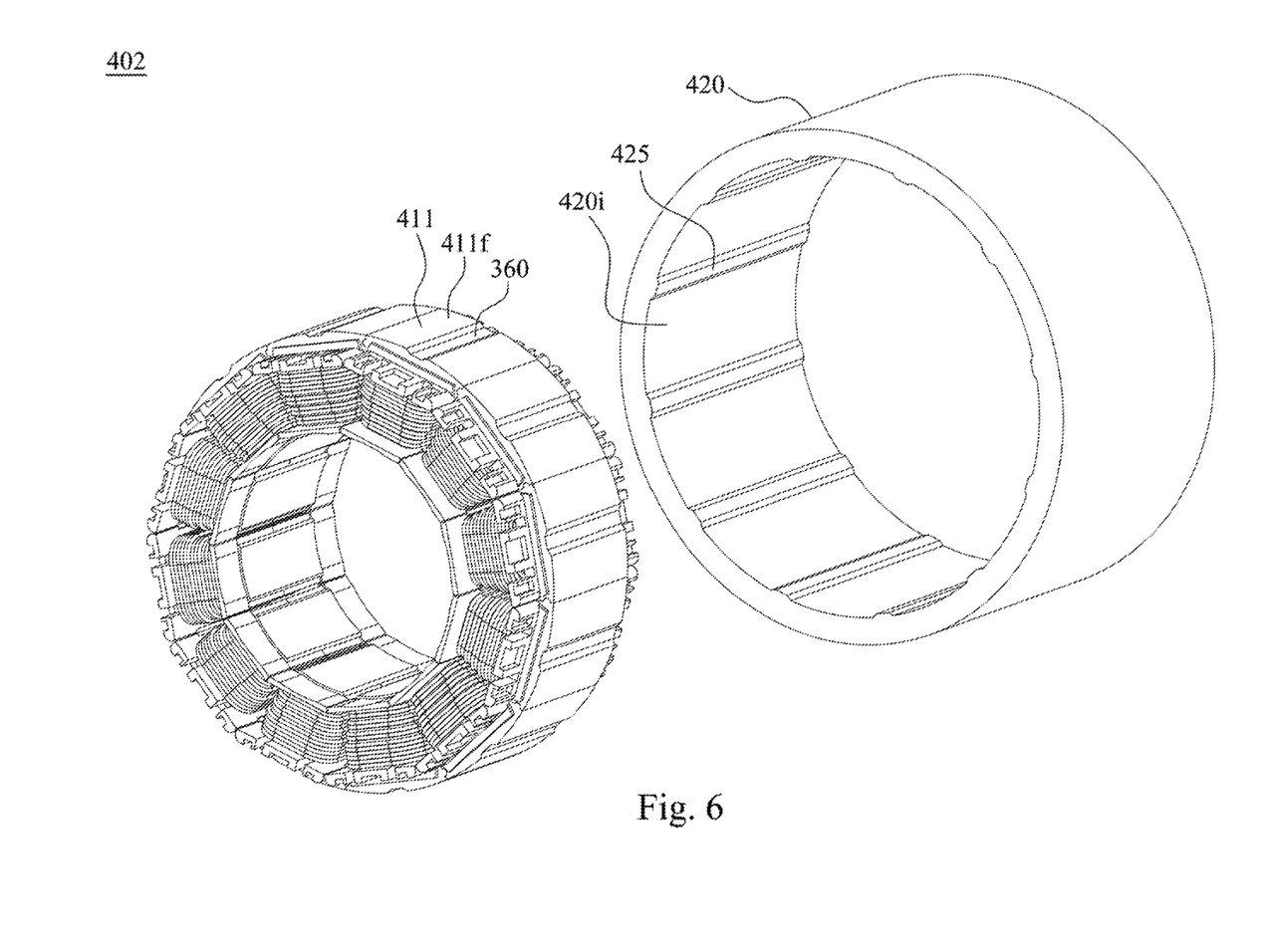
FIG. 6 is a schematic perspective view of the engaging type stator core according to another embodiment of this disclosure.

FIG. 6 is a schematic perspective view of the engaging type stator core 402 according to another embodiment of this disclosure. As shown in FIG. 6, the engaging type stator core 402 of this embodiment is similar to the engaging type stator core 401 of FIG. 5, and the main difference between the two is, in this embodiment, an inner surface 420i of the heat-dissipating structure 420 has a plurality of protruding portions 425. The protruding portions 425 correspond to the grooves 360 of the outer surface 411f of the closed annular structure 411, and the protruding portions 425 and the grooves 360 are coupled and fixed to each other when the heat-dissipating structure 420 is assembled to the closed annular structure 411.

Because the protruding portions 425 of the heat-dissipating structure 420 and the grooves 360 of the closed annular structure 411 are coupled and fixed to each other, the heat-dissipating structure 420 is at least partially in contact with the groove 360. Therefore, the stress concentrated in the groove 360 can be further alleviated, and the deformation issue of the yoke 300 can be further alleviated.

In addition, as shown in FIG. 1, the stator assembly 100 can be formed by vertically stacking a plurality of stator steel plates and then stamping the crimping zones 391, 392, 393, such that the stator steel plates are riveted to each other.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A stator assembly, wherein the stator assembly is configured to be assembled to form a stator core, the stator assembly comprising:
   a tooth and a yoke, wherein one end of the tooth is connected to the yoke, the yoke has an inner side, an outer side, a first coupling side, and a second coupling side, the inner side is connected with the tooth and one of the first and second coupling sides, the inner side includes an outer segment and an inner segment, the outer segment is arc-shaped, the inner segment is linear, the outer side is opposite to the inner side and is connected with the first coupling side and the second coupling side, the first coupling side comprises a first engaging structure, the second coupling side comprises a second engaging structure, the second engaging structure is configured to engage with the first engaging structure of another stator assembly, the outer side has a groove, the groove has a side surface and a bottom surface, an angle is defined between the side surface and the bottom surface, the angle is in a range from 135° to 165°, and a ratio of L340 to L311 is 1.1-2, where L340 is a distance between the first engaging structure and the inner side, and L311 is a length of the outer segment.

2. The stator assembly of claim 1, wherein a distance between the first engaging structure and the outer side is less than a distance between the first engaging structure and the inner side.

3. The stator assembly of claim 1, wherein widths between the inner side and the outer side of a portion of the yoke corresponding to the inner segment decrease as a distance between the portion and the tooth increases, and widths between the inner side and the outer side of portions of the yoke corresponding to the outer segment are approximately the same.

4. The stator assembly of claim 1, wherein a length ratio of L311 to L312 is 1:1, where L311 is a length of the outer segment, and L312 is a length of the inner segment.

5. The stator assembly of claim 1, wherein a portion connecting the inner segment and the tooth has a circular arc angle, and a ratio of L312 to L371 is 4:1, where L312 is a length of the inner segment, and L371 is a length of a radius of the circular arc angle.

6. An engaging type stator core, comprising:
   a plurality of stator assemblies of claim 1, wherein the stator assemblies are annularly arranged and engaged with each other to form a closed annular structure, and an outer surface of the closed annular structure is formed by the outer sides of the stator assemblies.

7. The engaging type stator core of claim 6, further comprising a heat-dissipating structure sleeved on the outer surface of the closed annular structure.

8. The engaging type stator core of claim 7, wherein an inner surface of the heat-dissipating structure has a plurality of protruding portions, the protruding portions correspond to the grooves of the outer surface of the closed annular structure, the protruding portions and the grooves are coupled and fixed to each other when the heat-dissipating structure is assembled to the closed annular structure.

* * * * *